United States Patent Office 2,941,987
Patented June 21, 1960

2,941,987
METHOD OF CURING RUBBERY FLUOROELASTOMERS

Lewis Dewey, Mishawaka, Ind., assignor to United States Rubber Company, New York, N.Y., a corporation of New Jersey No Drawing. Filed Mar. 19, 1958, Ser. No. 722,374

2 Claims. (Cl. 260—87.7)

This invention relates to a method of curing fluoroelastomer polymeric materials wherein an amine curing agent is used. More particularly my invention relates to a method of curing such fluoroelastomers as rubbery copolymers of vinylidene fluoride and hexafluoropropylene and/or rubbery copolymers of vinylidene fluoride and monochlorotrifluoroethylene.

The rubbery copolymers of vinylidene fluoride and hexafluoropropylene or monochlorotrifluoroethylene are commercial materials that have utility in high temperature applications. This is particularly so in the area of fuel cells. With the advent of high speed and high altitude aircraft the requirements for fuel cells have been steadily increasing, so that a material capable of withstanding such temperatures as 350–550° F. for prolonged periods is desired.

While rubbery copolymers of vinlylidene fluoride and hexafluoropropylene or monochlorotrifluoroethylene are potentially valuable materials for the above and similar applications, they are somewhat disadvantageous in that a considerable time is required for a satisfactory cure. Prior art teachings indicate that a satisfactory cure requires a time of the order of twenty-nine hours. The disadvantages of such a considerable length of time are obvious when considering production requirements.

Further, it is customary to use a cardboard form in the manufacture of fuel cells. The fluoroelastomer is coated on this cardboard form. However, a 29 hour cure is not feasible because the form will not withstand the high temperatures required for the cure. The cardboard tends to char and disintegrate, which results in a fuel cell of improper dimensions and contour, as well as slippage of lap seams, fittings, etc.

Accordingly, it is an object of my invention to develop a considerably more rapid cure for these rubbery fluoroelastomers. Another object of my invention is to obtain a rapid cure, yet not to sacrifice any of the desirable properties which were hitherto obtainable by use of the much longer prior art cures. A further object of my invention is to develop a rapid cure which will result in a fluoroelastomer having increased tensile strength and resistance to high temperature aging, yet will retain its original physical properties of high tensile strength, elongation, etc. possessed prior to heat aging. Additional objects will become apparent hereinafter.

By fluoroelastomers which are rubbery copolymers of vinylidene fluoride and hexafluoropropylene I mean copolymers containing at least 30 to 80 percent of vinylidene fluoride and correspondingly from 70 to 20 percent of hexafluoropropylene. It is possible to prepare copolymers containing hexafluoropropylene in any desired amount up to the theoretical maximum of 70% by weight. The properties of this kind of copolymer and methods for producing it are more fully described in "Vinylidene Fluoride-Hexafluoropropylene Copolymer," by S. Dixon et al., 49 Ind. and Eng. Chem. 1687 (October 1957), the contents of which are incorporated herein by reference.

Rubbery copolymers of vinylidene fluoride and hexafluoropropylene have been commercially produced by Du Pont Co. Its product, produced by conventional commercial methods, is known as "Viton A." The molecular weight of the copolymer may vary, and typically is within the range of fifty thousand to sixty thousand. More recently copolymers have been produced having much higher molecular weights of from 150,000 to about 200,000.

Fluoroelastomers which are rubbery copolymers of monochlorotrifluoroethylene and vinylidene fluoride are a commercially available type of synthetic rubber (sold under the trade name "Kel-F") described, for example, in an article by N. E. Conroy et al. entitled "Kel-F Elastomer Properties, Compounding, Vulcanization and Fabrication," appearing in the January, 1955 issue of "Rubber Age," pages 543–550, as well as in the article titled "Compounding Studies of Kel-F Elastomer" by Griffis and Montermoso, appearing in the July 1955 issue of "Rubber Age," pages 559–562. This elastomer is a saturated fluorocarbon polymer containing more than 50% fluorine by weight. Methylene groups are incorporated in the highly fluorinated polymer chain, thereby rendering the otherwise normally rigid chain elastic. The polymer chain is believed to consist essentially of $CH_2$, $CF_2$ and $CFCl$ groups. X-ray diagrams show that this polymer is amorphous at temperatures as low as —40° C. On stretching to 300%, typical fiber diagrams are observed, indicating susceptibility to orientation and crystal formation. The fluorocarbon polymer has good thermal stability, as shown by the fact that there is no evidence of chain scission or halogen loss after prolonged exposure at 440° F. Typical commercial polymers of this type contain monochlorotrifluoroethylene and vinylidene fluoride in about equal amounts. Other monomer ratios, such as 60% monochlorotrifluoroethylene and 40% vinylidene fluoride, or 95% monochlorotrifluoroethylene and 5% vinylidene fluoride are also used.

Strongly basic, primary and secondary aliphatic polyamines are satisfactory in curing the above fluoroelastomers. Typical of such amine curing agents are triethylene tetramine, tetraethylene pentamine, Trimene Base [1] (triethyl trimethylene triamine) and hexamethylene diamine. Optimum amine concentrations range from 1 to 6 parts of amine per 100 parts of fluoroelastomer.

My invention is based on the unexpected discovery that if the amine cure of the fluoroelastomer is carried out in the presence of ammonia the vulcanization can be effected rapidly without detriment to the physical properties, and with positive enhancement of the tensile strength.

The vulcanization may be carried out in an oven or autoclave at elevated pressure in an atmosphere of air and ammonia. The curing conditions will vary somewhat, depending on the exact properties and degree of cure desired in the final article, the size of the article, etc. In general, useful cures are obtainable over much the same time and temperature ranges as may be employed in ordinary rubber vulcanization. The temperature may range from about 150° to 350° F. The higher the temperature, the less is the time required for the cure. The amount of ammonia present in the air-ammonia atmosphere may vary from 4% to 100% by volume. A preferred range is from 4 to 33% ammonia by volume.

The following examples will illustrate and compare my invention and the result obtained by it with the prior art. All parts are by weight unless otherwise indicated.

---
[1] Registered trademark of Phillips Chemical Co. for a medium-abrasion furnace black.

EXAMPLE 1

Preparation of a batch using Viton A

The rubbery copolymer of vinylidene fluoride and hexafluoropropylene employed in this and Examples 2 and 3 was a commercial material known as "Viton A," made by the Du Pont Company. The molar ratio of vinylidene fluoride to hexafluoropropylene was 4 to 1. It was in the form of a gum and had the following properties:

| | |
|---|---|
| Specific gravity | 1.85. |
| Fluorine content | 65%. |
| Color | White, translucent. |
| Solubility | Ketones. |
| Storage stability | Excellent—no change in Mooney viscosity after 30 days at 100° F. |
| Mooney viscosity ML-4/212° F. | 35-55. |
| Williams plasticity | 110. |
| Recovery | 15. |

This gum was mixed on a rubber mill with other ingredients to provide the stock A given below.

STOCK A

| | |
|---|---|
| Viton A | 100 |
| Philblack A | 20 |
| Magnesium oxide | 5 |
| Hexamethylene diamine carbamate | 1.25 |
| Total | 126.25 |

The fluoroelastomer is milled at a mill roll temperature of 120-150° F.

EXAMPLE 2

Curing according to the prior art

A. 126.25 parts of Stock A were placed in a heater and subjected to an air pressure cure at a pressure of 40 p.s.i. and a temperature of 275° F. for one hour.

After this preliminary curing a post-cure was given as follows: one hour at 212° F., one hour at 250° F., one hour at 300° F., one hour at 350° F., and twenty-four hours at 400° F. The post curing was carried out in a circulating air oven, the temperature being brought up to 400° F. in a step-wise fashion as shown above. The total time for cure was twenty-nine hours.

B. Alternatively, the Stock A formulation of Example 1 is molded for thirty minutes at 275° F. in a press and then post-cured for twenty-eight hours in precisely the same manner as the post-cure above.

EXAMPLE 3

Applicant's ammonia-air cure

A. The Stock A formulation of Example 1 is placed in a dry heater that has been pre-warmed to 160° F. The temperature of the heater for the succeeding 5½ hour period is adjusted as follows:

30 minutes—temperature held at 160-180° F.
1 hour—temperature gradually raised to 230° F.
1 hour—temperature gradually raised to 262° F.
30 minutes—temperature gradually raised to 276° F.
1 hour and forty minutes—temperature held constant at 276° F.
40 minutes—heater permitted to cool down.
10 minutes—pressure bled to zero.
Total time 5½ hours.

The pressure is gradually raised to 45 p.s.i. during which time ammonia is metered in until the atmosphere is 8% ammonia by volume. The time required to introduce the ammonia and raise the pressure is about one hour. The above conditions are maintained for about 4 hours, after which the oven is gradually cooled down and the pressure gradually reduced to atmospheric.

Total time: 5½ hours.

B. Alternatively, the Stock A formulation of Example 1 is molded for 30 minutes at 275° F. in a press and then subjected to the same 5½ hour cure of Example 3A.

The following table gives comparative properties for the prior art's twenty-nine hour cure (Example 2) and applicant's five and one-half hour cure (Example 3).

TABLE 1

| | Tensile (p.s.i.) | Elongation (Percent) | Hardness (Shore) |
|---|---|---|---|
| Prior Art Cure: | | | |
| A. Air Pressure Cure at 275° F. and 40 p.s.i. followed by 29 hour post-cure | 1,512 | 340 | 85 |
| Aged 50 hours at 550° F | 1,232 | 300 | 85 |
| Aged 100 hours at 550° F | 934 | 215 | 90 |
| B. Molded 30 mins. at 275° F. followed by 29 hour post-cure | 1,794 | 230 | 78 |
| Aged 50 hours at 550° F | 1,446 | 227 | 81 |
| Aged 100 hours at 550° F | 1,298 | 160 | 85 |
| Applicant's five and one-half hour cure: | | | |
| A. Directly after Curing | 2,195 | 360 | 83 |
| Aged 50 hours at 550° F | 1,911 | 290 | 87 |
| Aged 115 hours at 550° F | 1,618 | 80 | 97 |
| B. Molding 30 mins. at 275° F. followed by 5½ hr. post-cure | 1,783 | 250 | 78 |
| Aged 50 hours at 550° F | 1,538 | 175 | 82 |
| Aged 100 hours at 550° F | 1,493 | 115 | 90 |

Considering the data given above, the comparative results are striking. It is to be noted that in every instance the tensile strength is higher when my cure is used as opposed to the prior art's twenty-nine hour cure. Further, the hardness is approximately the same in both instances, and the elongation does not suffer appreciably. Most importantly, the time for the vulcanization has been decreased significantly, my required time being less than 20% of the time as taught by the prior art.

EXAMPLE 4

Preparation of batch using Kel-F

The rubbery copolymer of vinylidene fluoride and monochlorotrifluoroethylene employed in this example, and Examples 5 and 6, was a commercial material known as "Kel-F 3700," made by the Minnesota Mining & Manufacturing Company. "Kel-F 3700" is, by weight, 30% monochlorotrifluoroethylene and 70% vinylidene fluoride and has the following properties:

| | |
|---|---|
| Specific gravity | 1.85. |
| Percent fluorine | Greater than 50%. |
| Color | Off-white. |
| Solubility | Ketones, acetates, ethers. |
| Storage stability | Excellent. |

This gum was mixed on a rubber mill with other ingredients to provide the Stock B given below.

STOCK B

| | |
|---|---|
| Kel-F 3700 | 100 |
| Philblack A | 20 |
| Magnesium oxide | 5 |
| Hexamethylene diamine carbamate | 1.25 |
| Total | 126.25 |

The fluoroelastomer is milled at a mill roll temperature of 120-150° F.

EXAMPLE 5

Curing according to the prior art

A. 126.25 parts of Stock B were placed in a heater and subjected to an air pressure cure at a pressure of 40 p.s.i. and a temperature of 275° F. for one hour.

After this preliminary curing a post-cure was given as follows: one hour at 212° F., one hour at 250° F., one hour at 300° F., one hour at 350° F., and twenty-four hours at 400° F. The post curing was carried out in a circulating air oven, the temperature being brought up to 400° F. in a step-wise fashion as shown above. The total time for cure was twenty-nine hours.

EXAMPLE 6

*Applicant's ammonia-air cure*

A. The Stock B formulation of Example 4 is placed in a dry heater that has been pre-warmed to 160° F. The temperature of the heater for the succeeding 5½ hour period is adjusted as follows:

30 minutes—temperature held at 160–180° F.
1 hour—temperature gradually raised to 230° F.
1 hour—temperature gradually raised to 262° F.
30 minutes—temperature gradually raised to 276° F.
1 hour and 40 minutes—temperature held constant at 276° F.
40 minutes—heater permitted to cool down.
10 minutes—pressure bled to zero.
5½ hours—total time.

The pressure is gradually raised to 45 p.s.i. during which time ammonia is metered in until the atmosphere is 8% ammonia by volume. The time required to introduce the ammonia and raise the pressure is about one hour. The above conditions are maintained for about 4 hours, after which the oven is gradually cooled down and the pressure gradually reduced to atmospheric.

Total time: 5½ hours.

The following table gives comparative properties for the prior art's twenty-nine hour cure (Example 5) and applicant's five and one-half hour cure (Example 6).

TABLE 2

| | Tensile (p.s.i.) | Elongation (Percent) | Hardness (Shore) | Modulus | | |
|---|---|---|---|---|---|---|
| | | | | 100% | 200% | 300% |
| Prior Art Cure: Air Pressure Cure at 275° F. and 40 p.s.i. followed by 29-hour post-cure | 2,200 | 520 | 78 | 224 | 581 | 1,310 |
| Applicant's Five and One-Half Hour Cure: Directly after curing | 2,845 | 490 | 77 | 285 | 945 | 1,978 |

The vulcanizate obtained by virtue of my cure is useful for lining tanks and the like used for storing, transporting, or processing solvents and other chemicals, such as fuel cells for gasoline, etc. Thus, my air-ammonia cure is very valuable in any application wherein a fluoroelastomer is to be cured by an amine.

It should be noted that the use of my air-ammonia atmosphere in conjunction with fluoroelastomers to be cured with an amine permits the use of lesser amounts of the amine curing agents than heretofore. Thus, with air-ammonia atmosphere I have found that the high temperature aging properties of a fluoroelastomer are improved by using a lesser amount of amine curing agent than that which is required by conventional cures. The following example illustrates this result.

EXAMPLE 7

| Ingredients | Stock C | Stock D |
|---|---|---|
| Viton A | 100 | 100 |
| Philblack A | 20 | 20 |
| Magnesium Oxide | 10 | 5 |
| HMDA Carbamate | 1.5 | 1.25 |

The above two Stocks, C, and D, were given the applicant's cure (5½ hours) and further heat aged for 50 hours at 550° F. After heat aging the following physical properties were noted:

| Property | Stock C | Stock D |
|---|---|---|
| Tensile | 1,480 | 1,917 |
| Elongation, Percent | 113 | 290 |
| Hardness (Shore) | 80 | 88 |

Having thus described my invention, what I claim and desire to protect by Letters Patent is:

1. A method of curing a fluoroelastomer selected from the group consisting of rubbery copolymers of vinylidene fluoride and hexafluoropropylene and rubbery copolymers of vinylidene fluoride and monochlorotrifluoroethylene in the presence of an amine curing agent comprising subjecting said fluoroelastomer under positive pressure in excess of one atmosphere to an air-ammonia atmosphere at a temperature of from 150° to 350° F., said ammonia being at least four percent by volume of said atmosphere.

2. A method of curing a fluoroelastomer selected from the group consisting of rubbery copolymers of vinylidene fluoride and hexafluoropropylene and rubbery copolymers of vinylidene fluoride and monochlorotrifluoroethylene in the presence of an amine curing agent comprising subjecting said fluoroelastomer under positive pressure in excess of one atmosphere to an air-ammonia atmosphere at a temperature of from 150° to 350° F., and ammonia being from 4 to 33% by volume of said atmosphere.

References Cited in the file of this patent

UNITED STATES PATENTS 2,304,637     Hardy _____ Dec. 8, 1952
2,793,200     West _____ May 21, 1957

OTHER REFERENCES

Bevilacqua: Cross-Linking of Latex Rubber, Science, vol. 123, January-June 1956, pages 1123 and 1124.

Dixon et al.: Vinylidine Fluoride-Hexafluoropropylene Copolymer, I.S.E.C., 49, #10, October 1957, pages 1687–1690.